United States Patent
Buschi et al.

(10) Patent No.: US 7,369,260 B2
(45) Date of Patent: May 6, 2008

(54) METHOD OF MANAGING E-MAIL ATTACHMENTS

(75) Inventors: Giovanni Buschi, Nice (FR); Apollonie Sbragia, Antibes Juan les Pins (FR)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 10/932,787

(22) Filed: Sep. 2, 2004

(65) Prior Publication Data

US 2005/0052692 A1 Mar. 10, 2005

(30) Foreign Application Priority Data

Sep. 5, 2003 (EP) .................................. 03368086

(51) Int. Cl.
*G06F 15/00* (2006.01)

(52) U.S. Cl. ...................... 358/1.15; 358/402; 709/206

(58) Field of Classification Search ............... 358/1.15, 358/402; 707/10, 102, 200; 709/202, 206
See application file for complete search history.

(56) References Cited

U.S. PATENT DOCUMENTS

| | | | |
|---|---|---|---|
| 5,760,773 A * | 6/1998 | Berman et al. ............. | 715/808 |
| 5,781,901 A | 7/1998 | Kuzma | |
| 6,275,848 B1 | 8/2001 | Arnold | |
| 6,505,236 B1 * | 1/2003 | Pollack ........................ | 709/206 |
| 6,654,746 B1 * | 11/2003 | Wong et al. .................. | 707/10 |
| 7,117,210 B2 * | 10/2006 | DeSalvo ....................... | 707/10 |
| 2001/0054073 A1 | 12/2001 | Ruppert et al. | |
| 2004/0158607 A1 * | 8/2004 | Coppinger et al. ......... | 709/206 |
| 2006/0026236 A1 * | 2/2006 | Scian et al. .................. | 709/206 |
| 2006/0031309 A1 * | 2/2006 | Luoffo et al. ............... | 709/206 |
| 2007/0022166 A1 * | 1/2007 | Bhogal et al. .............. | 709/206 |
| 2007/0078902 A1 * | 4/2007 | Buschi et al. ................ | 707/200 |

* cited by examiner

*Primary Examiner*—Kimberly A Williams
(74) *Attorney, Agent, or Firm*—Norman L. Gundel; Hoffman, Warnick & D'Alessandro LLC

(57) ABSTRACT

A method of managing e-mail attachments in a data transmission system comprising a data transmission network and at least one workstation connected thereto and wherein the user of the workstation can receive e-mails from at least one server within the network, at least one e-mail having a document being attached thereto. The method comprises creating an entry in a document references file containing a reference to the document when the document is detached from the e-mail, and generating an icon linked to the entry in the document references file, the icon being displayed when the e-mail is displayed.

5 Claims, 2 Drawing Sheets

METHOD OF MANAGING E-MAIL ATTACHMENTS

TECHNICAL FIELD

The present invention generally relates to the processing of documents that are attached to e-mails and in particular relates to a method of managing e-mail attachments.

BACKGROUND OF THE INVENTION

More and more e-mails are now exchanged through the Internet network. Often, a received e-mail includes a document attached thereto. The recipient which receives such an e-mail removes the document from the e-mail to save mail repository space. Therefore, a problem which is raised today is the traceability of the documents which have been detached from the e-mails.

U.S. patent application publication 2001/0054073 A1 describes a method and system for handling e-mails comprising several intermediate receivers. Any attachment in an e-mail is detached in the intermediate receiver and stored. Furthermore, the attachment is replaced with a reference to the stored attachment before the e-mail is forwarded to the recipient.

U.S. Pat. No. 6,275,848 describes a method and apparatus for the automated referencing of electronic information wherein rules including some criteria are applied for the detachment of the documents attached to an e-mail. When a document is detached, it is placed on a remote site and a pointer is inserted in the message, such a pointer being linked to the remote site.

U.S. Pat. No. 5,781,901 describes a system wherein an attachment to a e-mail sent by a sender to a recipient of a network is stored in a storage means visible to the network and relatively local to the sender. The sender requests an e-mail option from the recipient, which provides a configurable e-mail page to the sender in response to the request. An attachment reference comprising the network address of the attachment is supplied to the configurable e-mail page.

In all these prior patents, a pointer or a reference is used to maintain a permanent link between the pointer or reference and the detached document. However, none of these patents describes a method for keeping this link if the document is moved or renamed.

SUMMARY OF THE INVENTION

Accordingly, the present invention provides a method of managing e-mail attachments which enables the link between an e-mail and its attachment to be kept after the attachment has been detached, even if the attachment is moved, copied or renamed.

The invention therefore relates to a method of managing e-mail attachments in a data transmission system comprising a data transmission network and at least one workstation connected thereto and wherein a user of the workstation can receive e-mails from at least one server within the network, at least one e-mail having a document attached thereto. The method creates an entry in a document references file containing a reference to the document when the document is detached from the e-mail, and generates an icon linked to the entry in the document references file, the icon being displayed when the e-mail is displayed.

According to another aspect of the invention, the entry in the document references file contains a key calculated and set once when the document is detached from the e-mail in order to ensure permanently the link between the icon and the entry even if the document has been moved, copied or renamed.

BRIEF DESCRIPTION OF THE DRAWINGS

The above and other features and advantages of the invention will be better understood by reading the following more particular description of the invention in conjunction with the accompanying drawings wherein.

DETAILED DESCRIPTION OF THE INVENTION

Figure 1:
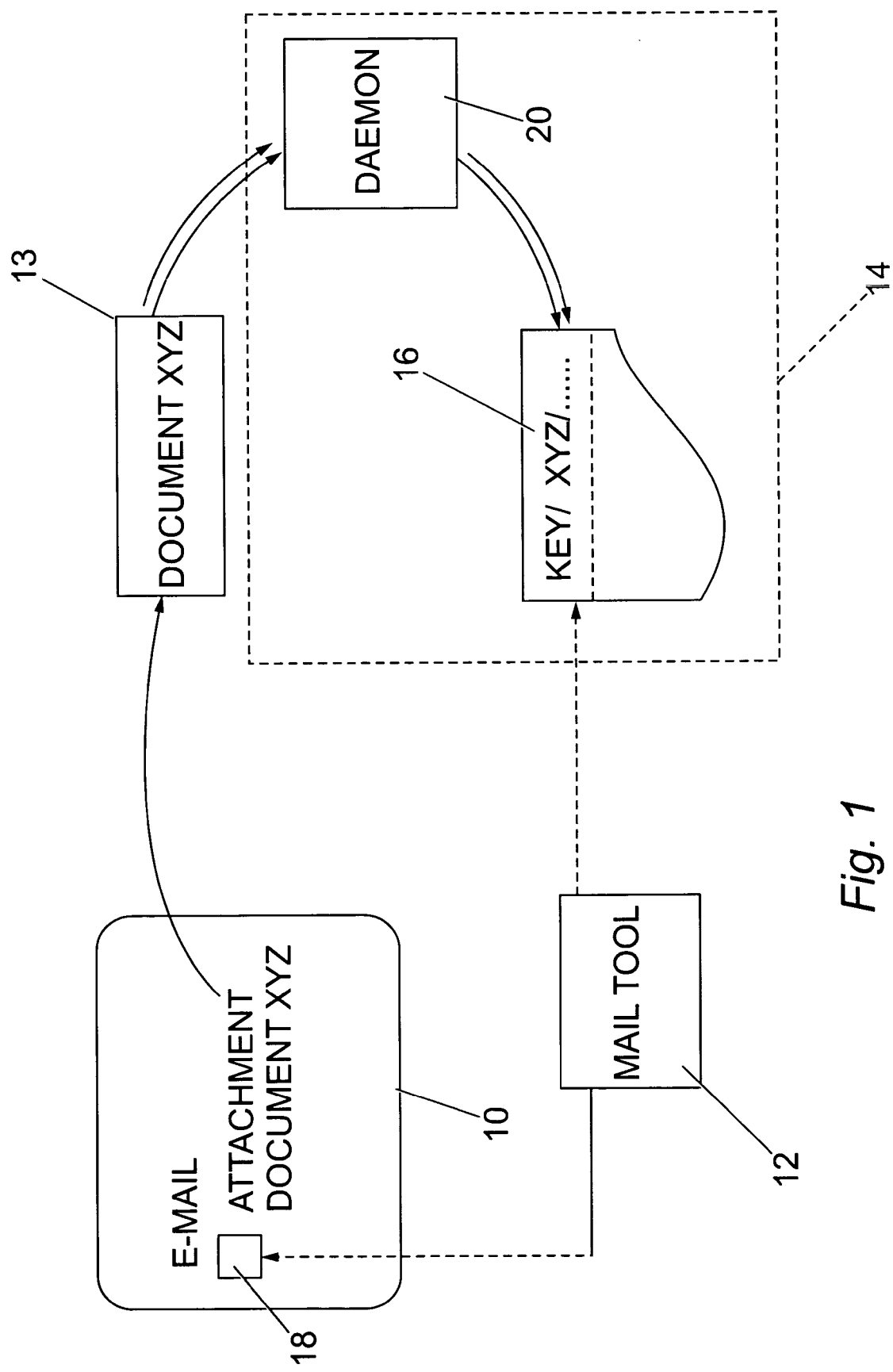
FIG. 1 is a schematic representation of different elements used for the implementation of the invention.

The present invention creates an up-to-date and permanent link between an e-mail and a document that is attached to the e-mail when the document is received by a user. Assuming that an e-mail is received, it is displayed on the screen 10 of the user's workstation, as illustrated in FIG. 1. The e-mail has a document XYZ attached thereto. The program "mail tool" 12 stores the attached document XYZ into a location 13 of a storage unit (e.g., a hard disk) when the user clicks on the command "detach" or any other command used for the action of detachment.

At the same time, the mail tool 12 creates both an entry in a document references file 16 in the operating system 14 and a document link icon 18 near the e-mail information on the screen 10. When selected (e.g., clicked), this icon establishes a link to the entry corresponding to the associated document in the document references file 16.

The document references file 16 contains for each document detached from an e-mail an entry having the following parameters:

a key calculated and set once when the document is detached and which is never changed as it must ensure permanently the link between the document link icon 18 and the document, the document name, for example XYZ, the document full path, which originally contains the full path of the location 13 where the document has been stored, and a deleted flag (Y/N) that is a Boolean set to true when the document is removed from the system.

In the operating system 14, a daemon 20 is run continuously. Assuming that the document XYZ is renamed, moved, copied or deleted by the user, this change is detected by the daemon 20, which immediately changes one or several variable parameters of the entry corresponding to the document in the document references file 16, such as the document name, the document full path and/or the deleted flag.

Figure 2:
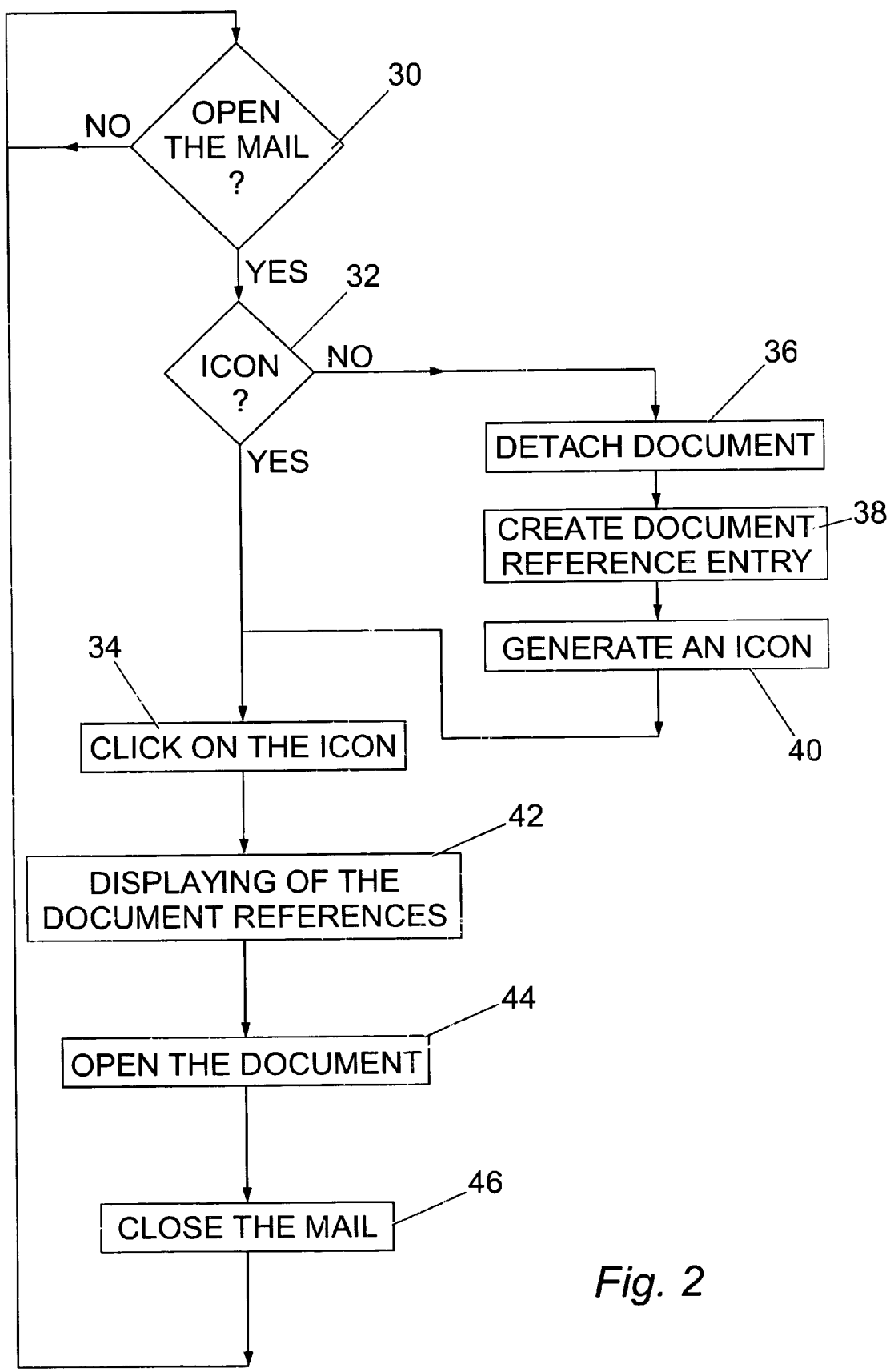
FIG. 2 is a flow chart of the steps used in the method according to the invention.

The method according to the invention is illustrated in FIG. 2, with reference to the components displayed in FIG. 1. The first step is the determination by the mail tool 12 whether the e-mail has been opened or not (step 30). If the e-mail has been opened, the e-mail is checked to determine if there is an icon 18 associated with the e-mail information on the screen 10 (step 32). If the icon 18 exists, the user can click on the icon 18 in order to obtain the document (step 34). If the icon 18 does not exits, this indicates that the attached document has not been detached and stored. If this is the case, the document is detached (step 36), an entry corresponding to the document file is created in the document references file 16 (step 38) and a document link icon 18 is generated on the screen 10 (step 40). The document can then be retrieved by clicking on the icon 18 (step 34).

When the icon 18 is selected, the references of the document are displayed on the screen 10 (step 42). Then, the user can open the document to read it (step 44). Then, the e-mail is closed (step 46) and the process is looped back to the beginning (step 30).

At any time, the user may change one or several parameters as mentioned above. If there is a change, the daemon 20 performs the modification of the entry corresponding to the document in the document references file 16 as explained above. Note that, if the document is copied, the path for the copy is recorded in the document references file 16 so that the entry contains the references of the two locations where the document is stored.

The method according to the invention reduces the time required to search for a detached/removed document. Further, it is easy to track the detached/removed document in an efficient way by just selecting (e.g., clicking on) an icon—even if this document has been renamed or moved.

The invention claimed is:

1. A method of managing e-mail attachments in a data transmission system comprising a data transmission network and at least one workstation connected thereto and wherein a user of the workstation can receive e-mails from at least one server within the network, at least one e-mail having a document attached thereto, the method comprising:

creating an entry in a document references file containing a reference to the document when the document is detached from the e-mail, the entry containing variable parameters, generating an icon linked to the entry in the document references file, the icon being displayed when the e-mail is displayed, and providing a continuously running daemon for detecting when any of the variable parameters of the document have been changed, wherein the daemon modifies the parameters in the entry of the document references file in response to a detected change.

2. The method according to claim 1, wherein the steps of creating and generating are performed by a mail tool in charge of managing the e-mails.

3. The method according to claim 1, wherein the entry in the document references file contains a key calculated and set once when the document is detached from the e-mail in order to ensure permanently the link between the icon and the entry.

4. The method according to claim 1, wherein the user can obtain the reference of the document contained in the document references file by selecting the icon.

5. The method of claim 1, wherein the variable parameters include a name of the document name and a full path location of the document.

* * * * *